(12) United States Patent
Kelley et al.

(10) Patent No.: US 8,645,816 B1
(45) Date of Patent: Feb. 4, 2014

(54) CUSTOMIZING USER DOCUMENTATION

(75) Inventors: Neal Kelley, Wenham, MA (US); Gnanasambandam Palaniswami, Shrewsbury, MA (US); Anne C. Pelon, Holliston, MA (US); Eric J. Wornham, Leominster, MA (US)

(73) Assignee: EMC Corporation, Hopkinton, MA (US)

( * ) Notice: Subject to any disclaimer, the term of this patent is extended or adjusted under 35 U.S.C. 154(b) by 1212 days.

(21) Appl. No.: 11/541,261

(22) Filed: Sep. 29, 2006

Related U.S. Application Data

(60) Provisional application No. 60/821,714, filed on Aug. 8, 2006.

(51) Int. Cl.
G06F 17/27 (2006.01)

(52) U.S. Cl.
USPC .......... 715/236; 715/234; 715/239; 715/273; 715/276; 715/277

(58) Field of Classification Search
USPC .............. 715/234, 236, 239, 273, 276, 277
See application file for complete search history.

(56) References Cited

U.S. PATENT DOCUMENTS

| | | | | |
|---|---|---|---|---|
| 6,377,956 B1 * | 4/2002 | Hsu et al. | | 1/1 |
| 6,405,216 B1 * | 6/2002 | Minnaert et al. | | 1/1 |
| 7,039,625 B2 * | 5/2006 | Kim et al. | | 707/706 |
| 7,207,001 B2 * | 4/2007 | Bailey et al. | | 715/234 |
| 7,233,885 B1 * | 6/2007 | Larabee et al. | | 703/1 |
| 7,996,759 B2 * | 8/2011 | Elkady | | 715/225 |
| 2002/0010716 A1 * | 1/2002 | McCartney et al. | | 707/517 |
| 2002/0049603 A1 * | 4/2002 | Mehra et al. | | 705/1 |
| 2002/0069317 A1 * | 6/2002 | Chow et al. | | 711/104 |
| 2002/0103720 A1 * | 8/2002 | Cline et al. | | 705/27 |
| 2002/0152200 A1 * | 10/2002 | Krichilsky et al. | | 707/3 |
| 2003/0046058 A1 * | 3/2003 | Stuckler et al. | | 704/7 |
| 2003/0106021 A1 * | 6/2003 | Mangrola | | 715/513 |
| 2003/0154289 A1 * | 8/2003 | Williamson et al. | | 709/227 |
| 2004/0015782 A1 * | 1/2004 | Day et al. | | 715/517 |
| 2004/0199876 A1 * | 10/2004 | Ethier et al. | | 715/523 |
| 2005/0050096 A1 * | 3/2005 | Gomes et al. | | 707/104.1 |
| 2005/0132284 A1 * | 6/2005 | Lloyd et al. | | 715/517 |
| 2005/0149861 A1 * | 7/2005 | Bishop et al. | | 715/515 |
| 2006/0156220 A1 * | 7/2006 | Dreystadt et al. | | 715/501.1 |
| 2006/0178864 A1 * | 8/2006 | Khanijo et al. | | 703/20 |
| 2006/0190401 A1 * | 8/2006 | Akadiri | | 705/50 |
| 2007/0208997 A1 * | 9/2007 | Jiang et al. | | 715/523 |
| 2007/0226610 A1 * | 9/2007 | Da Silva et al. | | 715/523 |
| 2007/0250769 A1 * | 10/2007 | Bass et al. | | 715/523 |

OTHER PUBLICATIONS

Shari Nakano; Adobe Acrobat 7 in a Snap; Jan. 19, 2005; Sams Publishing; pp. 15-16 and 27-30.*

* cited by examiner

*Primary Examiner* — Doug Hutton
*Assistant Examiner* — Andrew Dyer
(74) *Attorney, Agent, or Firm* — Krishnendu Gupta; Jason Reyes; Deepika Bhayana

(57) ABSTRACT

User documentation is customized. First and second pieces of user documentation content are generated based on predetermined requirements. The first piece is maintained independently from the second piece. The first and second pieces are processed in accordance with stylesheets. Localized content is derived from the first and second pieces. A deliverable document is derived from the first and second pieces. The document is provided in response to a user interface prompt.

9 Claims, 8 Drawing Sheets

US 8,645,816 B1

CUSTOMIZING USER DOCUMENTATION

CROSS-REFERENCE TO RELATED APPLICATIONS

This application claims the benefit of U.S. Provisional Application No. 60/821,714, filed Aug. 8, 2006, entitled USER PRESONALIZED DOCUMENTATION, which is incorporated herein by reference in its entirety.

FIELD OF THE INVENTION

The present invention relates to customizing user documentation.

BACKGROUND

The need for high performance in information technology systems, particularly high capacity information technology systems, is driven by several factors. In many industries, critical information technology applications require outstanding levels of service. At the same time, the world is experiencing an information explosion as more and more users demand timely access to a huge and steadily growing mass of data including high quality multimedia content. The users further demand that information technology solutions protect data and perform under harsh conditions with minimal data loss. Increasingly, the users also demand that information technology systems have improved ease of use, even as the systems become ever more complex, sophisticated, and feature laden.

Accordingly, the need for accurate and timely user documentation has increased. The need for accurate and timely user documentation is exacerbated by the fact that in many cases the users of these sophisticated and complex systems are not programmers or analysts but are business persons or other lay people.

At the same time, manual production of accurate and timely documentation is expensive, and a long-term and ongoing shortage of qualified documenters exists in the marketplace. In particular, in many development environments, most qualified developers and analysts are already busy attempting to meet deadlines for new systems or attempting to keep existing systems running in a satisfactory fashion.

SUMMARY OF THE INVENTION

User documentation is customized. First and second pieces of user documentation content are generated based on predetermined requirements. The first piece is maintained independently from the second piece. The first and second pieces are processed in accordance with stylesheets. Localized content is derived from the first and second pieces. A deliverable document is derived from the first and second pieces. The document is provided in response to a user interface prompt.

One or more embodiments of the invention may provide one or more of the following advantages.

User documentation may be created without taking excessive valuable time from existing programmers and analysts. User documentation may be created relatively automatically without excessive amounts of manual input. User documentation may be created cost effectively in terms of computer resources required and run time needed to produce the documentation.

A company may be better positioned to meet low end self-install customer segments being targeted by a low end product line. The company and its partners may improve in-field productivity with easy to use documentation. Support costs may be decreased as a result of less assistance being needed beyond the documentation provided to the field. Partners and resellers may be able to avoid rehosting web-based information. Customer satisfaction may be improved.

Other advantages and features will become apparent from the following description, including the drawings, and from the claims.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

As described in more detail below, techniques are provided that may be used in creating a user accessible and intuitive online information and documentation distribution channel. In at least one embodiment, in support of an "ease of use" business initiative, the techniques:

aid customers, partners, and employees who are involved in product install, configure, upgrade, and troubleshoot activities (e.g., who are involved in self-installable products);

allow users to enter information describing themselves and their need (product, activity, topic) and have a system configure and serve user personalized documents (UPDs) specific to the customer need (e.g., UPDs can be in PDF or other formats such as html);

provide appropriate Web based access such that any customer, including those of partners and resellers, can access the UPD system; and provide a single repository of controlled minimum revisable units (MRU's) which are the discrete information units from which UPDs are configured.

Conventionally, documentation to support product install and troubleshooting is hard to use and non-intuitive to non-company/non-expert users. In a particular example, installers conventionally must navigate through a dozen or more major steps and thousands of pages of documentation from tens of published documents. Customers of partners and resellers conventionally cannot log in to internal educational sites.

In particular, conventional documentation to support self installable products and troubleshooting is hard to use and non-intuitive to the non-company/non-expert users.

In contrast, in accordance with the techniques described herein, for example, many if not all end users can create their customized documentation for their specific products (e.g., low end products) in any of multiple (e.g., 9) languages supported.

Figure 1:
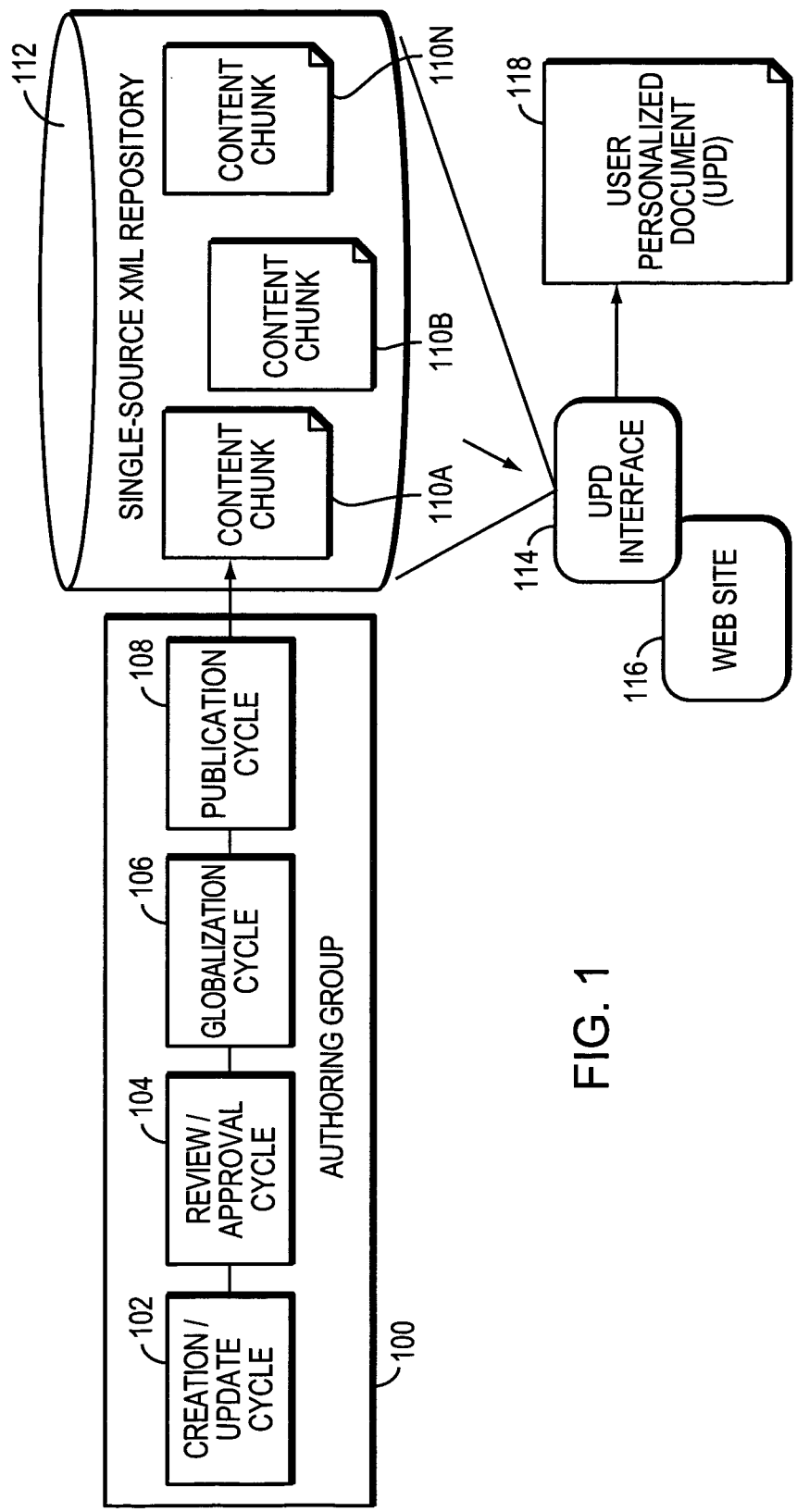
FIGS. 1-2 are diagrammatic views of a user personalized document system.

FIG. 1 illustrates a high level context for the techniques. In an authoring group 100, an authoring process is executed that includes a creation/update cycle 102, a review/approval cycle 104, a globalization cycle 106, and a publication cycle 108. The output of the authoring process includes content chunks 110A, 110B, . . . 110N that are stored in a single source XML repository 112. In at least one implementation, authors maintain the content chunks rather than static, separate documents.

By interacting with a user personalized document (UPD) interface 114 at a Web site 116, a user can cause a UPD 118 to be created and provided based on the content chunks. In at least some implementations, users can personalize by choosing a language preference, choosing a task, choosing options, and/or choosing a level of detail, and the content chunks are dynamically assembled into UPDs.

Figure 2:
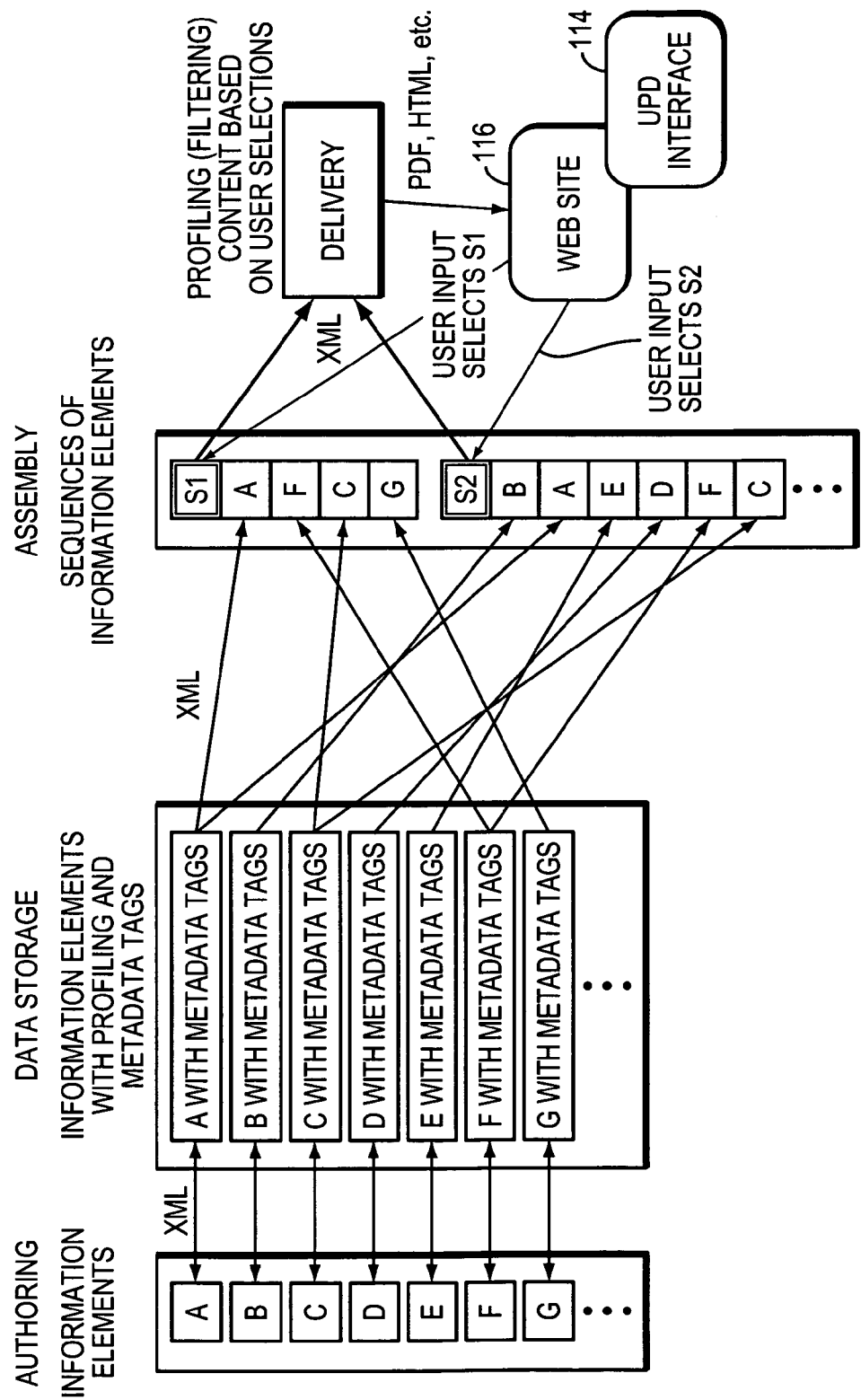
Figure 3A:
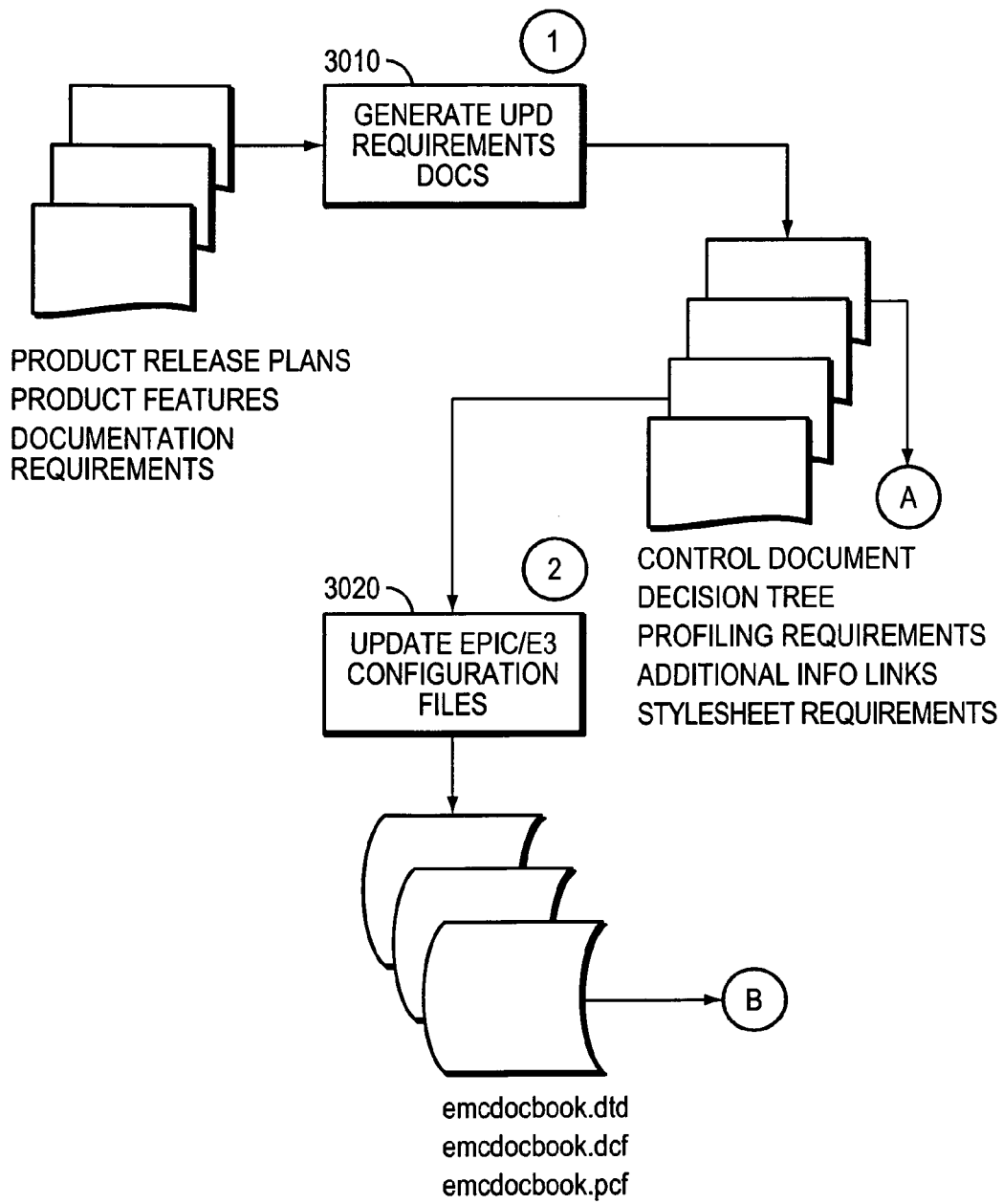
FIGS. 3A-3F are flow diagrams of procedures for use with the system of FIGS. 1-2.
Figure 3B:
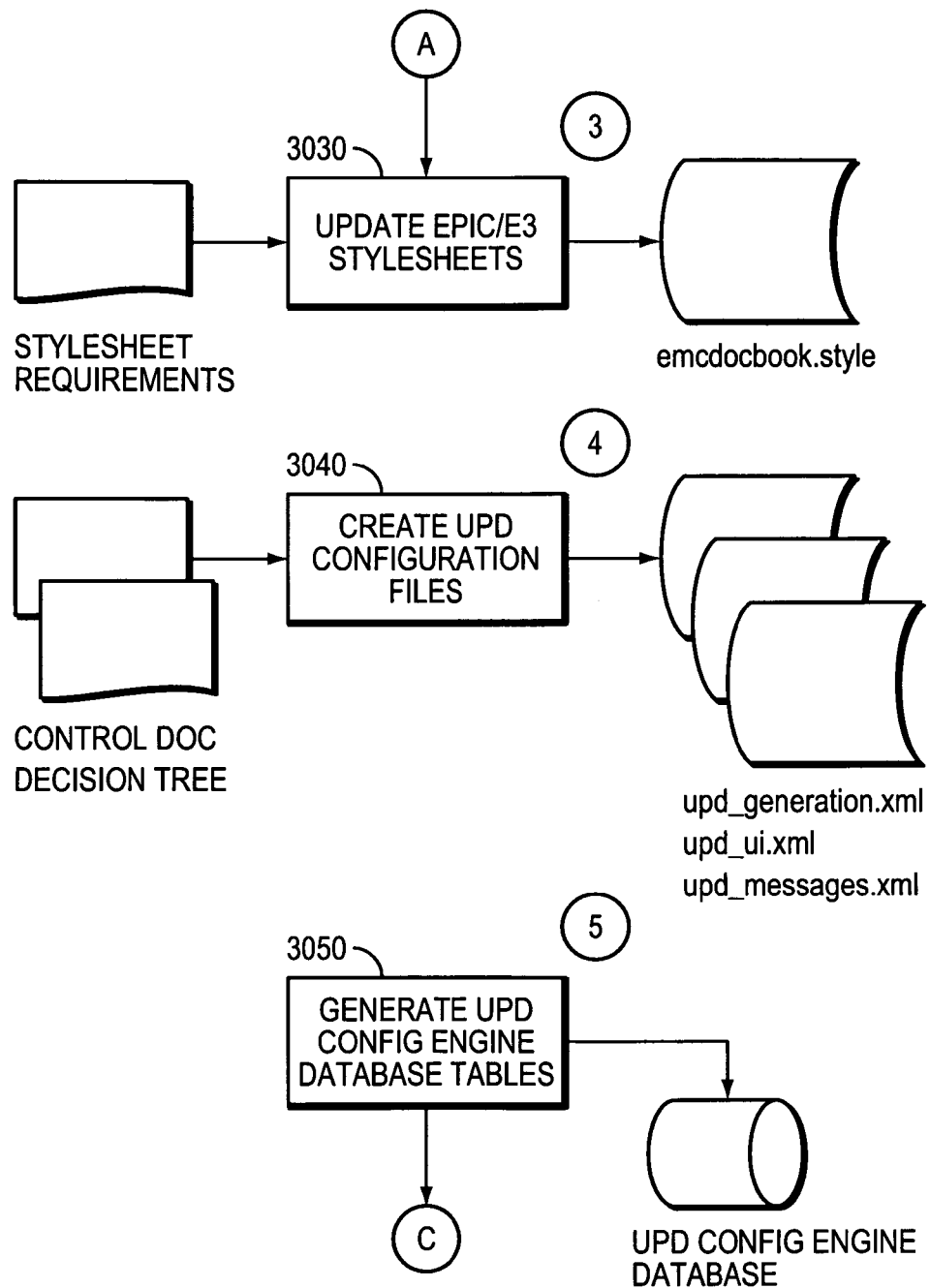
Figure 3C:
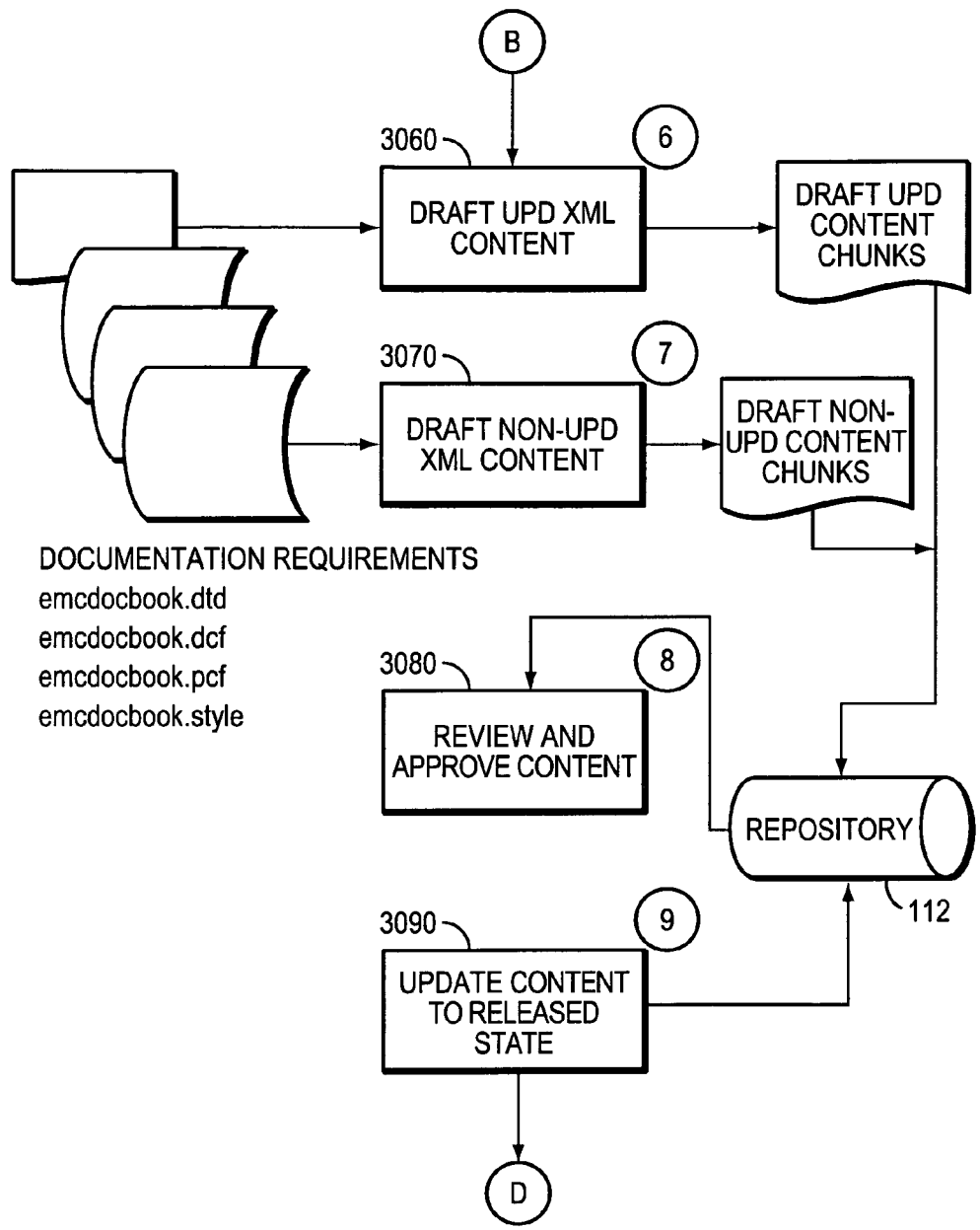
Figure 3D:
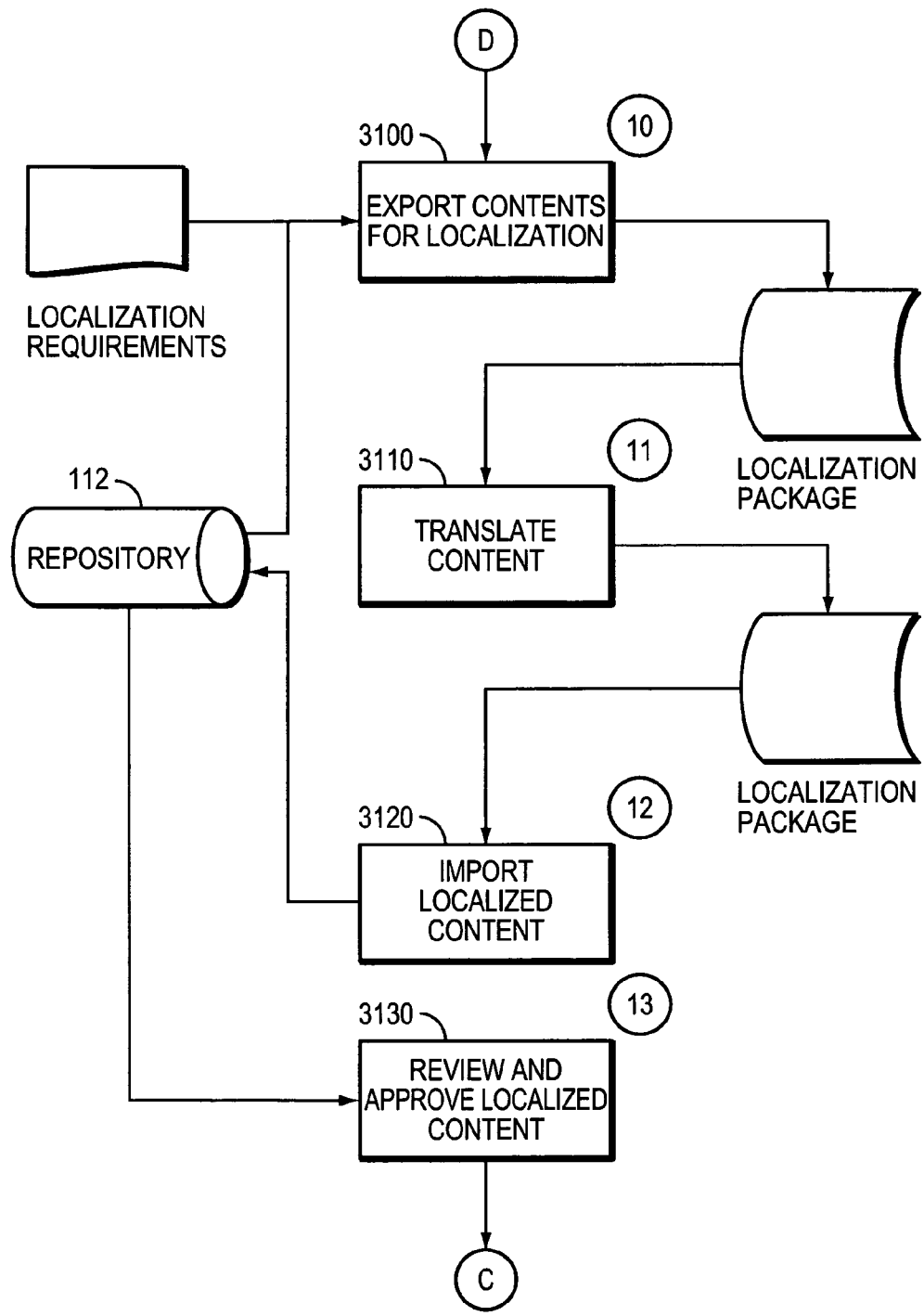
Figure 3E:
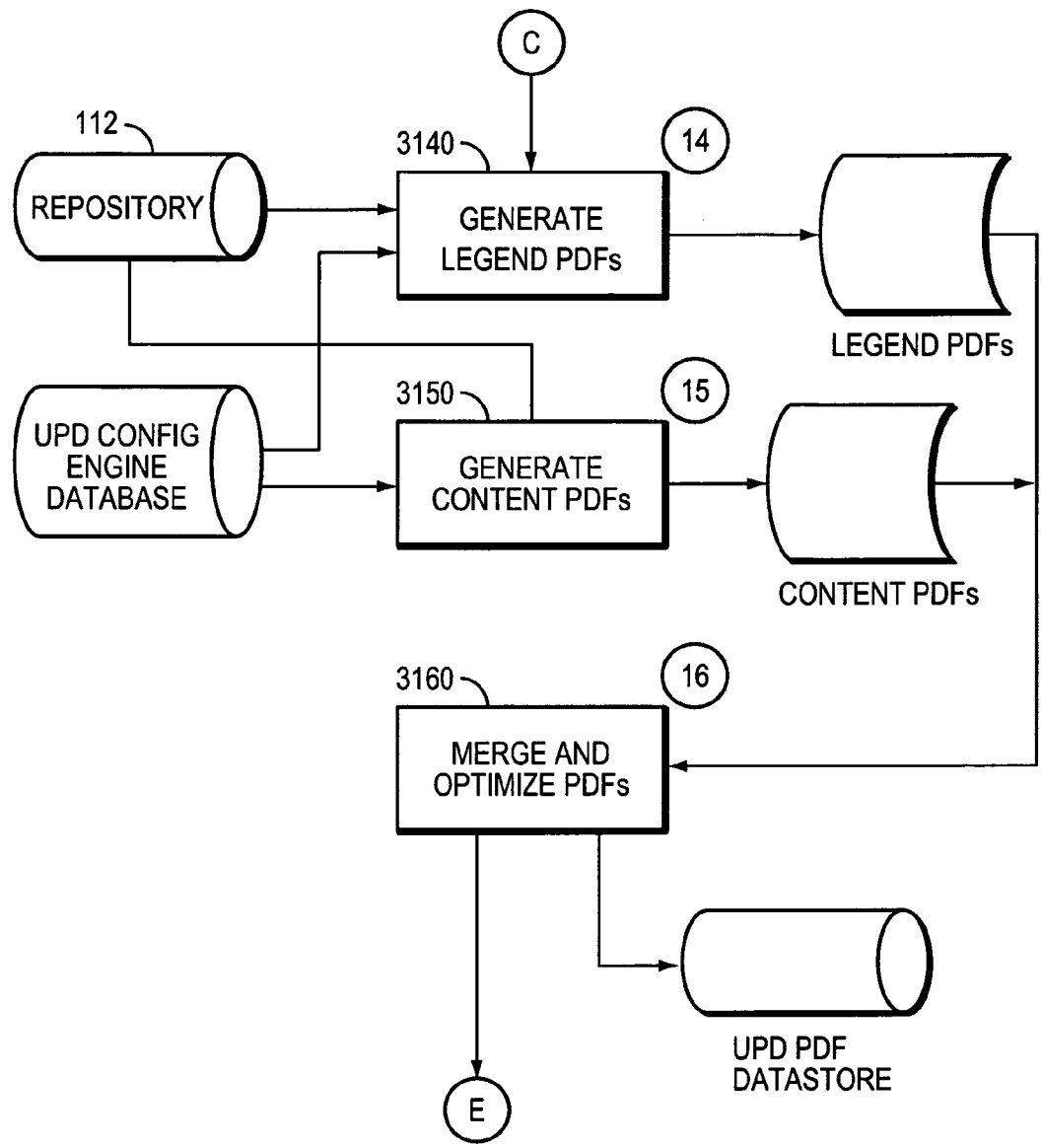
Figure 3F:
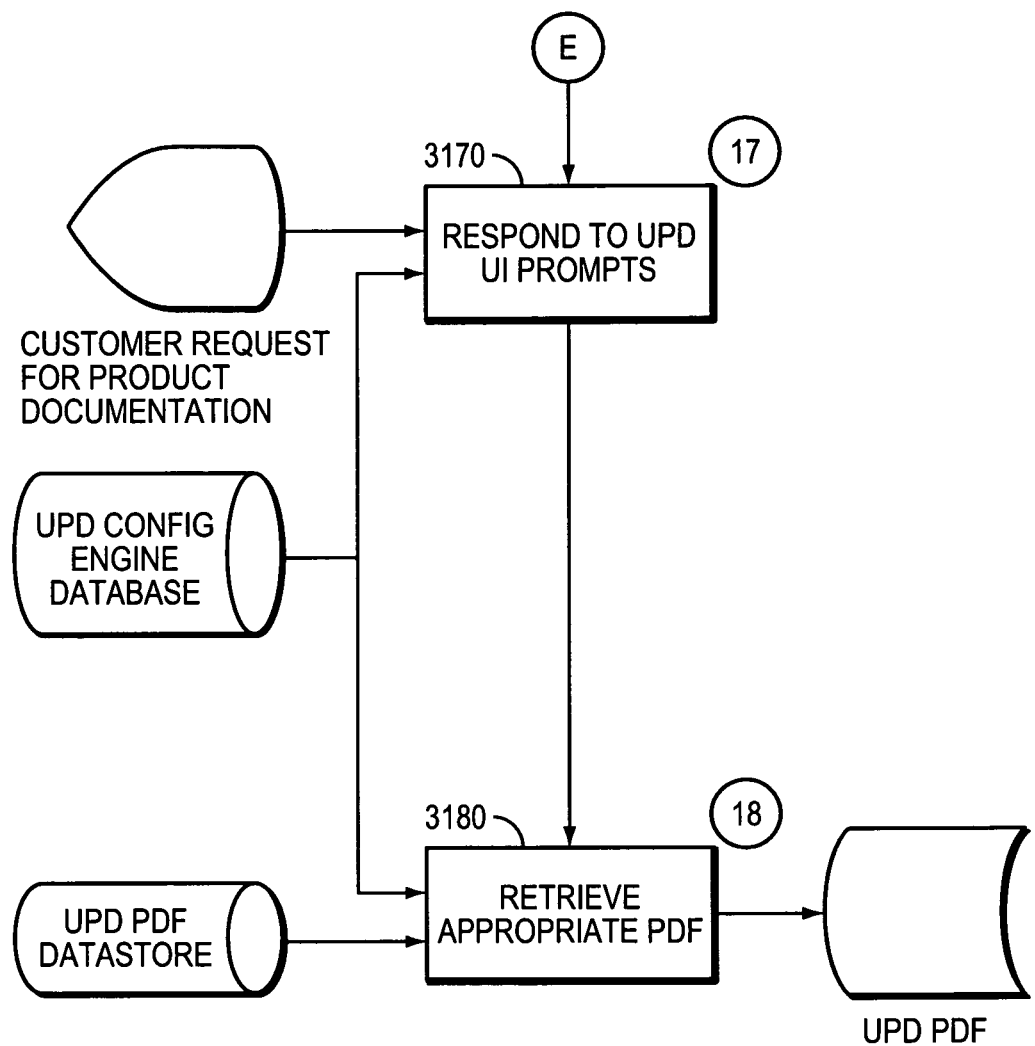

FIG. 2 illustrates further aspects of UPD production. In particular, in an authoring stage, information elements with profiling are created. In a data storage stage, the information elements are stored with metadata tags. In an assembly stage, the information elements are assembled into sequences such as sequences S1, S2 (e.g., based on user input at site 116). In a delivery stage, after the user selects one or more of the sequences via interface 114 at site 116, one or more documents (e.g., in PDF or HTML format) is returned. In at least some implementations, data modeling is used to help determine effective parsing and tagging of the information elements, and each information element has multiple language versions.

FIGS. 3A-3F illustrate an example of techniques for use in providing the UPDs as described above. UPD requirements documents are generated (step 3010, at circle 1). A data storage system engineering product roadmap specifies product release plans and product features. A data storage system technical documentation group identifies overall documentation requirements for new product releases including UPD system documentation requirements and non-UPD system documentation requirements. The data storage system technical documentation group further details UPD system documentation requirements:

Control Document—a MICROSOFT WORD document that specifies the following:
UPD system user interface (UI) requirements
Profiling requirements for the XML authoring and publishing software (e.g. Epic/E3) profiles
Decision Tree—A MICROSOFT EXCEL document that specifies product profiling and compatibility rules and additional information links to supplemental content to be accessible from the UPD system UI (associated with specific product profiling)
Stylesheet Requirements—specifies any changes required to emcdocbook stylesheets described below. Stylesheets are a collection of style settings that govern the appearance of a document when output as PDF using XML publishing, or when displayed in XML authoring. Style settings control basic formatting information such as font size, paragraph spacing, page layout and advance features such as the automatic generation of table of contents.

XML authoring and publishing software (e.g., Epic Editor/E3) configuration files are updated (step 3020, at circle 2), e.g., by an information technology group. Specific updates may include:
emcdocbook.dtd—company extension to standard stylesheet (e.g., to AXdocbook.dtd, which is the Arbortext implementation of the Docbook standard)
emcdocbook.dcf—company extension to standard XML authoring and publishing software document type configuration file—used to control profiling dialog within XML authoring and publishing software.
emcdocbook.pcf—company extension to standard XML authoring and publishing software profiling configuration file—used to specify profiling attributes and groups within XML authoring and publishing software.

The updated XML authoring and publishing software configuration files are distributed to the authors and are installed on author desktops for use with XML authoring and publishing software. In addition, the XML authoring and publishing software configuration files are installed on XML publishing servers for use in PDF generation.

Stylesheets are updated (step 3030, at circle 3). The information technology group uses XML authoring and publishing software (e.g., Epic Editor with Styler) to maintain stylesheets (e.g., XSL-FO/FOSI stylesheets).

The updated XML authoring and publishing software stylesheet files are distributed to the authors and installed on the author desktops for use with XML authoring. In addition, the XML authoring and publishing software stylesheet files are installed on the XML publishing servers for use in PDF generation.

UPD configuration files are created (step 3040 at circle 4). The information technology group takes the Control Document and Decision Tree documents as inputs and updates UPD configuration files:
upd_generation.xml—This file configures UPD profiling attributes values, UPD Master Document templates, and UPD Constraints (product profiling compatibility rules). This file is used for UPD Configuration Engine database table generation.
upd_ui.xml—This file configures locale-specific URL links used by the UPD Configuration Engine.
upd_messages.xml—This file specifies all text used by the UPD system UI and Legend PDF Generator. Since the file is later localized, a separate file is available for each language supported by the UPD system UI.

The UPD Configuration files are included in a JAVA ARchive (.jar) file used by the UPD Configuration Engine during UPD PDF retrieval processing. The upd_confi-gengine.jar file is deployed on the UPD Configuration Engine server.

UPD Configuration Engine database tables are generated (step 3050 at circle 5). The information technology group generates UPD Configuration Engine Database tables and data by executing java programs that use the upd_generation.xml file. These programs determine valid UPD document permutations. Three database tables and sets of data are generated:
updquestions_prod_release_xx—this table contains a question data set used during UPD UI processing.
updpdfs_prod_release_xx—this table contains a PDF profiling data set used during Content PDF generation.
updlegends_prod_release_xx—this table contains a legend data set used during Legend PDF generation.

UPD XML content is drafted (step 3060 at circle 6). Authors draft UPD XML content in XML chunks using XML authoring software, the company configuration files, and a specialized XML application (e.g., a Documentum XML application). The XML chunks are maintained (e.g., by a Documentum application) using the company object model. Chunks are classified as:
Company (e.g., EMC) Master Document—top-level document
Company (e.g., EMC) Information Object—re-useable component chunks
Company (e.g., EMC) Artwork—re-useable graphics files.

UPD chunks and their elements are profiled using the profiling attributes defined as part of the specification of document requirements.

The specialized XML application controls chunking rules, i.e., how XML documents are burst into separate XML units on import/check-in to a repository (e.g., a Documentum repository).

Non-UPD XML content is drafted (step 3070 at circle 7). Authors draft non-UPD XML content (content that may be referenced as "Additional Information") using XML authoring software and the company configuration files. In at least some cases, non-UPD XML content may use some of the same chunks and even the same master document (e.g. the planning master document) as the UPD XML content.

Content is reviewed and approved (step 3080 at circle 8). Authors review documents with product experts and iterate the content. Changes are made using XML authoring software and are tracked using version control (e.g., Documentum version control).

Content is updated to a released state (step 3090 at circle 9). Approved documents are set to a lifecycle state of RELEASED by use of UPD jsp and java code. In a specific implementation, this code automatically traverses the Documentum virtual document and updates the lifecycle state of all XML chunks, and all documents being processed are assigned a Documentum lifecycle policy; a document is processed through the following lifecycle states:

In Work
Final Draft
In Review
Pre-Production
Released
In Translation
Translation Released Contents are exported for localization (step 3100 at circle 10). The technical operations group exports content for localization using UPD jsp and java code implemented as part of a localization workflow. In at least one implementation, English content is exported for translation into the following languages:

Simplified Chinese
French
German
Italian
Korean
Japanese
Portuguese
Spanish

The localization export code:

Exports the selected stylesheets, XML chunks, help content and message files (e.g., from Documentum) using defined export validation rules. Virtual XML documents are exported as chunks—only those chunks that have been modified since the last localization are exported.
Creates a packing list that describes all exported content.
Creates a ZIP archive file of content and packing list
Transfers the content to the requested localization vendor's FTP site.
Notifies selected company and localization vendor personnel that content has been transferred to the localization vendor's FTP site.
Tracks the status of localization using document meta-data and UPD localization tracking tables (e.g., in the DOCUMENTUM ORACLE database).

Content is translated (step 3110 at circle 11). Company globalization program office (GPO) works with the localization vendor to coordinate translation requirements. The localization vendor processes the content (e.g., through SDL Trados Translation Memory) and translates the content to the languages requested in the localization package. The localization vendor puts the translated content with language-specific stylesheets on their FTP site in a ZIP archive file and notifies GPO that the content is available for import.

Localized content is imported (step 3120 at circle 12). A Technical Operations group imports the localized content using UPD jsp and java code implemented as part of a localization workflow. The localization import code:

Validates the import package contents to verify the expected contents and stylesheets.
Imports Stylesheets, Help Files and Message Files (e.g., as complete Documentum files.
Imports XML chunks (e.g., using the Documentum XML application) and re-builds virtual documents (e.g., Documentum virtual documents).
Updates the document meta-data and UPD localization tracking tables.

The imported content is automatically stored in the repository (e.g., Documentum repository).

Localized content is reviewed and approved (step 3130 at circle 13). GPO coordinates the review of localized content within the company and the localization vendor. The review, update, approval process is iterative and continues until the localized content is approved.

Legend PDFs are generated (step 3140 at circle 14). The information technology group generates Legend PDFs using UPD java code, the XML publishing software API (e.g., E3 API), and UPD Configuration Engine database tables. In a specific implementation, the Legends PDFs are may be generated in the following languages:

Simplified Chinese
English
French
German
Italian
Japanese
Korean
Portuguese
Spanish.

Content PDFs are generated (step 3150 at circle 15). The information technology group generates content PDFs using UPD java code, the XML publishing software API (e.g., E3 API), and UPD Configuration Engine database tables. The code first exports the content from the repository (e.g., Documentum repository), applying validation rules as part of the export. The Content PDFs may be generated in the nine languages specified above.

PDFs are merged and optimized (step 3160 at circle 16). The information technology group merges the Legend and Content PDF using UPD java code. Following the creation of merged PDF, the PDF is optimized using rules (e.g., as defined in Adobe Professional). The final PDFs are then deployed on the UPD Configuration Engine server for retrieval by the UPD system UI.

UPD system UI prompts are responded to (step 3170 at circle 17). The UPD system UI is implemented via JSP, JAVA and PL/SQL code that uses the UPD Configuration Engine database and the UPD XML configuration files.

Following the deployment of the UPD system UI code and optimized PDF content to the UPD Configuration Engine Server, UPD is available for use by the company, third party partners and end-users.

Access to the UPD system is available from the Web site for users having a desktop internet browser (e.g., INTERNET EXPLORER) and a PDF reader (e.g., ADOBE PDF Reader). UPD Wizard JSP pages are deployed and executed as applications (e.g., by APACHE TOMCAT Web Server) for pertinent products.

Users who access the UPD system respond to a series of questions based on their product and desired action (e.g., plan, install, upgrade, replace).

Appropriate PDFs are retrieved (step 3180 at circle 18). The user responses to questions result in a match between user requirements and a pre-cached UPD PDF document. The PDF document is retrieved by the UPD system and made available for review on-line or printing. In addition, additional information links are made available based on the user responses. These links provide access to non-UPD PDFs that may also be reviewed on-line or printed.

At least one implementation may include or rely on one or more of the following features and/or resources.

Hardware resources may include DELL 2650s (CPU servers executing WINDOWS SERVER 2003), UNIX servers (e.g., for the Configuration Engine database), and EMC SYMMETRIX Storage (ILM Solution). Software resources may include ARBORTEXT Editor v. 5.1H (XML editor for authoring), ARBORTEXT Publishing Engines 5.1H (PDF generation), ARBORTEXT Architect (DTD), ARBORTEXT Styler (Stylesheets), and DOCUMENTUM 5.25 SP3 (Content Management System). The DocBook standard may be used.

The author client computer may have or execute WINDOWS XP or 2000, ARBORTEXT Editor 5.1H (with UPD custom stylesheets, UPD custom profiling configuration files, and UPD custom DTD), ARBORTEXT Styler 5.1H, ARBORTEXT Architect 5.1H, ADOBE PDF reader, and/or DOCUMENTUM Desktop 5.2.5 SP3.

The UPD user client computer may have or execute an Internet browser (e.g., Internet Explorer 6.0) and/or ADOBE PDF Reader.

The DOCUMENTUM Content Server may have or execute WINDOWS SERVER 2003, DOCUMENTUM Content Server 5.2.5 SP3, DOCUMENTUM Webtop 5.2.5 SP3, DOCUMENTUM DA 5.2.5 SP3, APACHE TOMCAT 5.0.28, ORACLE 9i JDBC Client, SUN JDK 1.4.2_06, ADOBE ACROBAT 7.0 Professional, UPD XML application (DocApp), UPD custom configuration files, UPD custom JSP, UPD custom JAVA, and/or UPD custom JAVASCRIPT.

The ORACLE Database Server may have or execute SOLARIS 8, ORACLE 9i DBMS, DOCUMENTUM Database Instance, UPD custom UI tables, UPD custom localization tables, UPD custom stored procedure packages, and/or UPD custom database sequences.

The Content Publishing Server may have or execute WINDOWS SERVER 2003, ARBORTEXT E3 5.1H (with UPD custom stylesheets, UPD custom profiling configuration files, UPD custom DTD), ADOBE ACROBAT Distiller Server 6.0, UPD custom joboptions file, ADOBE Type Manager Deluxe 4.1 (with UPD custom fonts) and/or UPD custom distiller .joboptions.

The UPD Configuration Engine Server may have or execute WINDOWS SERVER 2003, APACHE TOMCAT 5.0.28, ORACLE 9i JDBC Client, SUN JDK 1.4.2_06, UPD custom configuration files, UPD custom JSP, UPD custom JAVA, and/or UPD custom JAVASCRIPT.

Other embodiments are within the scope of the invention. For example, video clips, audio clips, and/or documents with dynamic content may be produced.

The invention claimed is:

1. A method for use in customizing user documentation, comprising:
  generating a requirements document for predetermined requirements, wherein the predetermined requirements include a language requirement, a product requirement, a planned action requirement, and a document formatting requirement;
  generating first and second pieces of user documentation content using the predetermined requirements for creating a user documentation, wherein the first and second pieces of user documentation content comprises respective first and second user documentation content chunks, wherein the first user documentation content chunk is associated with a first set of profile attributes and the second user documentation content chunk is associated with a second set of profile attributes, wherein the first and second set of profile attributes are stored with metadata tags in a repository;
  applying the metadata tags to the first and second pieces of user documentation content;
  maintaining the first piece independently from the second piece, wherein the first and second pieces of user documentation content are stored in the repository, wherein the first piece is processed in the repository independently from the second piece;
  deriving localized content from the first and second pieces by translating content of the first piece and the second piece to another language based on the language requirement specified in a localization component, wherein deriving the localized content results in a separate virtual document, wherein the virtual document gathers the first and second pieces of user documentation content into a logical unit;
  converting the first and second pieces of user documentation content into respective first and second component documents, wherein first and second pieces of user documentation content are represented by a virtual document and stored in a first file format, wherein the first and second component documents are stored in a second file format, wherein the first file format is different from the second file format, wherein the first file format comprises an XML format, wherein the second file format comprises a portable file format;
  creating configuration files, wherein the configuration files include compatibility rules;
  creating configuration engine database tables including at least a question data set;
  generating a set of questions including a product selection question, a language selection question, and a planned action selection question for the product based on the question data set included in the configuration engine database tables;
  deriving the deliverable document from the first and second component documents by merging the first component document with the second component document, wherein merging the first component document with the second component document includes merging and applying the compatibility rules included in the configuration files to the first and second component documents in the portable file format;
  presenting, in a user interface prompt, the set of questions;
  receiving a set of responses to the presented questions, wherein the set of responses are based on the predetermined requirements; and
  providing the deliverable document in response to the set of responses.

2. The method of claim 1, further comprising:
updating a stylesheet.

3. The method of claim 1, further comprising:
drafting XML content for use in deriving the deliverable document.

4. The method of claim 1, further comprising:
reviewing and approving content for use in deriving the deliverable document.

5. The method of claim 1, further comprising:
updating content to a released state for use in deriving the deliverable document.

6. The method of claim 1, further comprising:
exporting content for localization for use in deriving the deliverable document.

7. The method of claim 1, further comprising:
importing localized content for use in deriving the deliverable document.

8. The method of claim 1, further comprising:
generating legend content for use in deriving the deliverable document.

9. The method of claim 1, wherein providing the deliverable document further comprising:
storing the deliverable document on a computer system; and
retrieving the deliverable document from the computer system in response to a user interface prompt.

* * * * *